US011987892B2

(12) United States Patent
Fatigati et al.

(10) Patent No.: US 11,987,892 B2
(45) Date of Patent: May 21, 2024

(54) METAL CLEANING COMPOSITIONS COMPRISING FUROATE ESTERS AND USES THEREFOR

(71) Applicant: NORTH AMERICAN PRODUCTS GROUP, LLC, Cuero, TX (US)

(72) Inventors: Michael Fatigati, Dayton, OH (US); William Farone, Irvine, CA (US); Rocio Rivera, Orange, CA (US); Dawnell Haupt, Corinth, MS (US); David Mccreery, Sunset Hills, MO (US); Devin Whipple, Longmeadow, MA (US)

(73) Assignee: NORTH AMERICAN PRODUCTS GROUP, LLC, Cuero, TX (US)

( * ) Notice: Subject to any disclaimer, the term of this patent is extended or adjusted under 35 U.S.C. 154(b) by 854 days.

(21) Appl. No.: 16/962,460

(22) PCT Filed: Jan. 18, 2019

(86) PCT No.: PCT/US2019/014130
§ 371 (c)(1),
(2) Date: Jul. 15, 2020

(87) PCT Pub. No.: WO2019/143893
PCT Pub. Date: Jul. 25, 2019

(65) Prior Publication Data

US 2021/0071309 A1 Mar. 11, 2021

Related U.S. Application Data

(60) Provisional application No. 62/619,600, filed on Jan. 19, 2018.

(51) Int. Cl.
*C11D 3/20* (2006.01)
*C11D 1/02* (2006.01)
(Continued)

(52) U.S. Cl.
CPC ................ *C23G 1/063* (2013.01); *C11D 1/02* (2013.01); *C11D 1/75* (2013.01); *C11D 1/90* (2013.01);
(Continued)

(58) Field of Classification Search
CPC .... C11D 3/18; C11D 3/23; C11D 3/34; C11D 3/30; C11D 3/2093; C11D 3/2096
(Continued)

(56) References Cited

U.S. PATENT DOCUMENTS 2,113,754 A 4/1938 Zimmer et al.
2,282,343 A * 5/1942 Prutton ................ C10M 141/10 508/502
(Continued)

FOREIGN PATENT DOCUMENTS

CA 2185308 4/1997
CN 105143195 A 12/2015
(Continued)

OTHER PUBLICATIONS

Khaled K.F. Understanding Corrosion Inhibition of Mild Steel in Acid Medium by Some Furan Derivatives: A Comprehensive Overview, J. Electrochem. Soc., 157(3), C116-C124, Jan. 12, 2010, (doi: 10.1149/1.3274915). Jan. 12, 2010 (Jan. 12, 2010) p. C116.
(Continued)

*Primary Examiner* — Gregory R Delcotto
(74) *Attorney, Agent, or Firm* — Casimir Jones, S.C.; J. Mitchell Jones

(57) ABSTRACT

Disclosed are metal cleaning formulations and methods of use. A formulation of the present teachings comprises one or more furoate esters such as ethyl 5-methyl-2-furoate and methyl 5-methyl-2-furoate. The formulations further comprise a base oil, which can be, for example, a naphthenic oil, a synthetic oil or a combination thereof. In some embodi-
(Continued)

ments, a formulation can further comprise a metal protection additive and a lubrication additive. A variety of base oils, metal protection additives, and lubrication additives are suitable for use in the present teachings. Formulations of the present teachings are especially useful for the cleaning of metal products such as firearms. The cleaning power of a formulation of the instant teachings can exceed that required for US Military Specifications.

29 Claims, 1 Drawing Sheet

(51) Int. Cl.

| | |
|---|---|
| ***C11D 1/75*** | (2006.01) |
| ***C11D 1/90*** | (2006.01) |
| ***C11D 1/92*** | (2006.01) |
| ***C11D 3/04*** | (2006.01) |
| ***C11D 3/18*** | (2006.01) |
| ***C11D 3/26*** | (2006.01) |
| ***C11D 3/28*** | (2006.01) |
| ***C11D 3/30*** | (2006.01) |
| ***C11D 3/34*** | (2006.01) |
| ***C11D 11/00*** | (2006.01) |
| ***C11D 17/06*** | (2006.01) |
| ***C23G 1/06*** | (2006.01) |

(52) U.S. Cl.

CPC .................. *C11D 1/92* (2013.01); *C11D 3/04* (2013.01); *C11D 3/18* (2013.01); *C11D 3/2093* (2013.01); *C11D 3/2096* (2013.01); *C11D 3/30* (2013.01); *C11D 3/34* (2013.01); *C11D 11/0088* (2013.01); *C11D 17/06* (2013.01); *C23G 1/061* (2013.01)

(58) Field of Classification Search

USPC ....... 510/245, 247, 254, 261, 274, 400, 500, 510/505

See application file for complete search history.

(56) References Cited

U.S. PATENT DOCUMENTS

| | | | | | |
|---|---|---|---|---|---|
| 2,330,238 | A * | 9/1943 | Prutton | C10M 141/10 508/588 |
| 2,362,284 | A | 11/1944 | McDonald | |
| 5,259,701 | A | 11/1993 | Gerhart et al. | |
| 5,877,133 | A | 3/1999 | Good | |
| 8,710,250 | B2 | 4/2014 | Mikochik et al. | |
| 9,102,644 | B2 | 8/2015 | Mikochik et al. | |
| 9,108,940 | B2 | 8/2015 | Mikochik et al. | |
| 2006/0116297 | A1 * | 6/2006 | Basar | C10M 171/02 508/460 |
| 2009/0247439 | A1 | 10/2009 | Kato et al. | |
| 2014/0162913 | A1 | 6/2014 | Mccreery | |
| 2014/0194633 | A1 | 7/2014 | Mikochik et al. | |
| 2016/0000066 | A1 | 1/2016 | Bergez-lacoste et al. | |
| 2017/0349739 | A1 * | 12/2017 | Kim | C10M 171/04 |

FOREIGN PATENT DOCUMENTS

| | | | | |
|---|---|---|---|---|
| EP | 531585 A1 * | 3/1993 | C10M 101/02 |
| EP | 1428866 A1 * | 6/2004 | C10M 163/00 |
| JP | 2007-119680 | 5/2007 | |
| JP | 2014-065854 * | 4/2014 | |
| WO | 2014046982 | 3/2014 | |

OTHER PUBLICATIONS

International Search Report & Written Opinion, International Application No. PCT/US2019/014130, dated Apr. 8, 2019, 9 pages.

* cited by examiner

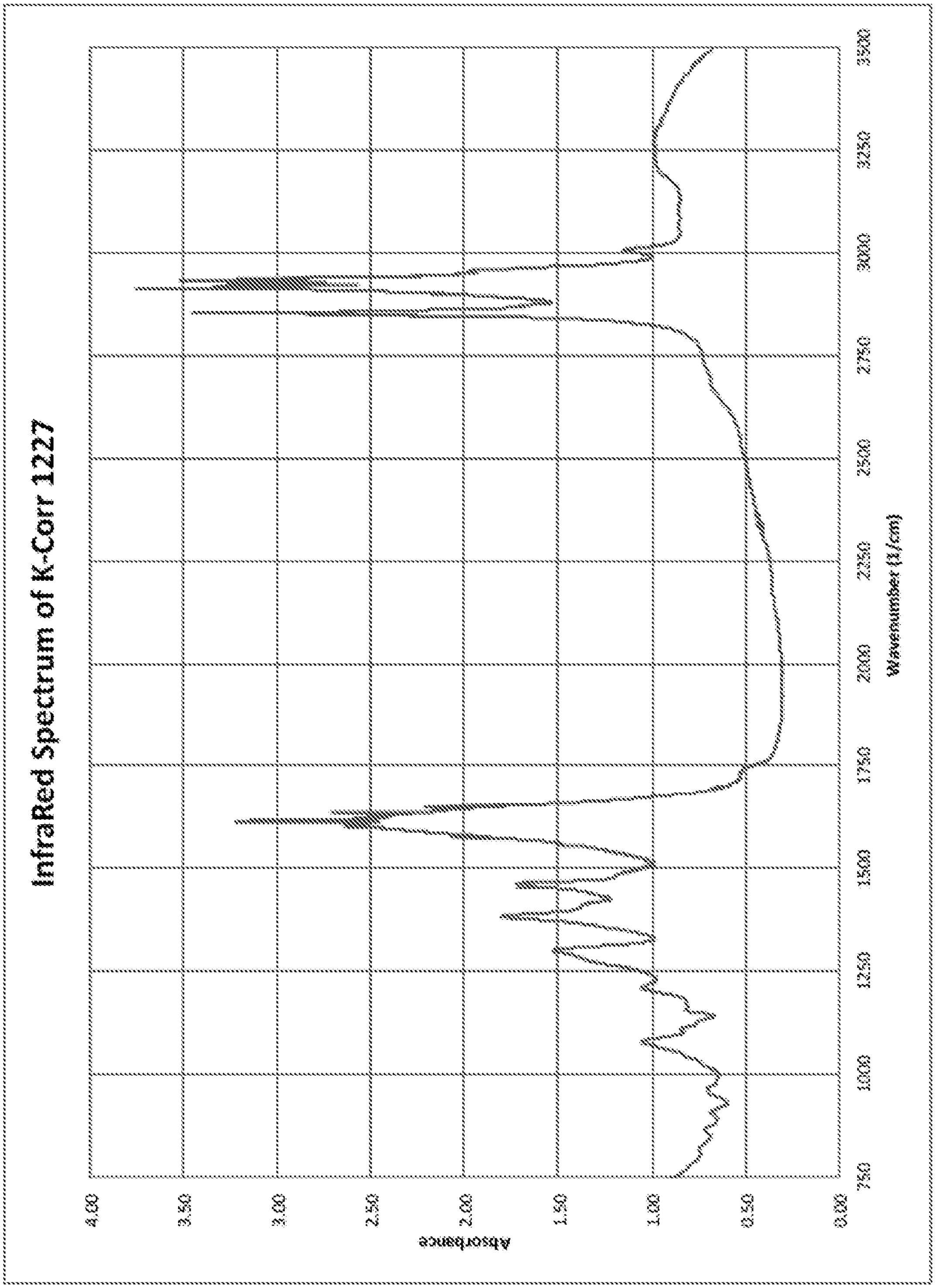
InfraRed Spectrum of K-Corr 1227
Absorbance
4.00
3.50
3.00
2.50
2.00
1.50
1.00
0.50
0.00
Wavenumber (1/cm)
750
1000
1250
1500
1750
2000
2250
2500
2750
3000
3250
3500

METAL CLEANING COMPOSITIONS COMPRISING FUROATE ESTERS AND USES THEREFOR

CROSS REFERENCE TO RELATED APPLICATION

This application claims benefit of and priority to U.S. Provisional Application 62/619,600 filed on Jan. 19, 2018. Application 62/619,600 is herein incorporated by reference in its entirety.

FIELD

This application is related to the field of environmentally sustainable cleaning formulations.

INTRODUCTION

Formulations used in the cleaning, lubrication and protection of metals usually contain base oils, solvents and various additives for lubrication and protection of metals.

Such formulations are used in the cleaning, lubrication, and corrosion protection of machinery, automotive and agricultural equipment, and firearms.

Furoate esters are a class of chemical compounds that can be made from renewable resources such as sugars, starch and cellulosic materials. Furoate esters are chemical compounds of structure

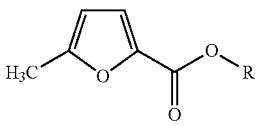

wherein R is an alkyl moiety of 1-4 carbons. The alkyl "R" moiety can be a linear, branched or cyclic alkyl moiety. Methods of production of furoate esters are known, and described in publications such as U.S. Pat. Nos. 8,710,250, 9,102,644 and 9,108,940, and US Patent Application Publication 2014/0194633. Non-limiting examples of furoate esters include ethyl 5-methyl-2-furoate (ET408™, xF Technologies, Albuquerque, NM) and methyl 5-methyl-2-furoate (ME 408™, xF Technologies, Albuquerque, NM). These esters are useful for pharmaceutical, food, and fragrance molecules, as well as fuels and fuel additives. Furoate ester production is discussed in detail in U.S. Pat. Nos. 8,710,250, 9,102,644 and 9,108,940. Examples of furoate esters include compounds that are esters of 5-methyl-2-furoic acid, which can be derived from 5-chloromethyl-2 furaldehyde.

Formulations used in the cleaning, lubrication and protection of metals are needed that contain renewable materials or can be made from renewable chemicals so as to be ecologically sustainable while lessening dependence on petroleum sources.

SUMMARY

The inventors have developed compositions comprising furoate esters such as the ethyl and methyl furoate esters. These formulations can be used as metal cleaners for the cleaning, lubrication and/or corrosion protection of metal products.

In various embodiments, a composition of the present teachings can comprise at least one base oil and at least one furoate ester. In various embodiments, a composition of the present teachings can further comprise at least one metal protection additive. In various embodiments, a composition of the present teachings can further comprise at least one lubrication additive.

In various configurations, a metal cleaner of the present teachings can comprise 20% to 70% by weight of at least one base oil. In various configurations, a metal cleaner of the present teachings can comprise 3% to 60% by weight of at least one furoate ester. In various configurations, a metal cleaner can further comprise 0.1% to 15% by weight of at least one metal protection additive. In various configurations, a metal cleaner can further comprise 0.5% to 20% by weight of at least one lubrication additive.

In some configurations, a composition of the present teachings can comprise the at least one base oil in an amount of 20% to 50% by weight. In some configurations, a composition of the present teachings can comprise the at least one furoate ester in an amount of 3% to 60% by weight.

In some configurations, a composition of the present teachings can include the at least one metal protection additive at 0.1% to 5% by weight, and the at least one lubrication additive at 1% to 15% by weight.

In some configurations, a composition of the present teachings can include the at least one base oil at 35% to 50% by weight, and the at least one furoate ester at 10% to 40% by weight.

In some configurations, a composition of the present teachings can include the at least one metal protection additive at 0.2% to 5% by weight, and the at least one lubrication additive at 1% to 10% by weight.

In some configurations, a base oil of a composition of the present teachings can be, can comprise, can consist of, or can consist essentially of a naphthenic oil, a synthetic oil, or a combination thereof.

In some configurations, a furoate ester of a composition of the present teachings can be ethyl 5-methyl-2-furoate.

In some configurations, a furoate ester of a composition of the present teachings can be methyl 5-methyl-2-furoate.

In some configurations, a composition of the present teachings can include ethyl 5-methyl-2-furoate, methyl 5-methyl-2-furoate, or a mixture of ethyl 5-methyl-2-furoate and methyl 5-methyl-2-furoate.

In some configurations, a base oil of a composition of the present teachings can be, can comprise, can consist of, or can consist essentially of 22 cSt naphthenic oil, 280 cSt naphthenic oil, 16-17 cSt polyalphaolefin oil, or a combination thereof.

In some configurations, a base oil of a composition of the present teachings can be, can comprise, can consist of, or can consist essentially of 22 cSt naphthenic oil.

In some configurations, a base oil of a composition of the present teachings can be, can comprise, can consist, of, or can consist essentially of 16-17 cSt polyalphaolefin oil.

In some configurations, a base oil of a composition of the present teachings can be, can comprise, can consist of, or can consist essentially of a combination of 22 cSt naphthenic oil and 280 cSt naphthenic oil.

In some configurations, a base oil of a composition of the present teachings can be, can comprise, can consist of, or can consist essentially of a combination of 16-17 cSt polyalphaolefin oil and 22 cSt naphthenic oil.

In some configurations, a lubrication additive of a composition of the present teachings can be, can comprise, can consist of, or can consist essentially of at least one active ingredient such as alkyl phosphate amine esters, inactive sulfurized olefin, sulfurized fatty acid ester, or a combination thereof.

In some configurations, a lubrication additive of a composition of the present teachings can be, can comprise, can consist of, or can consist essentially of alkyl phosphate amine esters.

In some configurations, a lubrication additive of a composition of the present teachings can be, can comprise, can consist of, or can consist essentially of an inactive sulfurized olefin.

In some configurations, a lubrication additive of a composition of the present teachings can comprise, can be, can consist of, or can consist essentially of a sulfurized fatty acid ester.

In some configurations, a metal protection additive of a composition of the present teachings can be, can comprise, can consist of, or can consist essentially of a triazole metal protectant, a mixture of amino acid and imidazoline derivatives, parachlorobnzotrifluoride, a carrier oil comprising sulfonates, or a combination thereof.

In some configurations, a metal protection additive of a composition of the present teachings can be, can comprise, can consist of, or can consist essentially of a triazole metal protectant.

In some configurations, a metal protection additive of a composition of the present teachings can comprise, can be, can consist of, or can consist essentially of a mixture of amino acid and imidazoline derivatives.

In some configurations, a metal protection additive of a composition of the present teachings can comprise, can be, can consist of, or can consist essentially of parachlorobenzotrifluoride.

In some configurations, a metal protection additive of a composition of the present teachings can comprise, can be, can consist of, or can consist essentially of a carrier oil, wherein the carrier oil can comprise 2% to 6% by weight, or about 2% to about 6% by weight, of at least one sulfonate, which can be, without limitation, calcium dinonylnaphthalene sulfonate. In various configurations, the carrier oil can comprise 1% to 6% by weight, or about 1% to about 6% by weight of at least one sulfonate, which can be, without limitation, calcium dinonylnaphthalene sulfonate.

In some configurations, a composition of the present teachings can comprise, can consist of, or can consist essentially of about 43.8% by weight of 22 cSt naphthenic oil, about 10% by weight of 280 cSt naphthenic oil, about 33% by weight of ethyl 5-methyl-2-furoate, about 0.2% by weight of a metal protection additive comprising a triazole metal protectant, about 12% by weight of a carrier oil comprising sulfonates, and about 1% by weight of a lubrication additive comprising alkyl phosphate amine esters.

In some configurations, a composition of the present teachings can comprise, can consist of, or can consist essentially of about 43.8% by weight of 22 cSt naphthenic oil, about 10% by weight of 280 cSt naphthenic oil, about 33% by weight of ethyl 5-methyl-2-furoate, about 0.2% by weight of a metal protection additive comprising a triazole metal protectant, about 12% by weight of at least one carrier oil comprising sulfonates, and about 1% by weight of a lubrication additive comprising alkyl phosphate amine esters.

In some configurations, a composition of the present teachings can comprise, can consist of, or can consist essentially of about 68% by weight of 22 cSt naphthenic oil, about 5% of ethyl 5-methyl-2-furoate, about 12% by weight of parachlorobenzotrifluoride, about 0.3% by weight of a metal protection additive comprising a triazole metal protectant, about 12% by weight of a carrier oil comprising sulfonates, and about 2% by weight of a lubrication additive comprising alkyl phosphate amine esters.

In some configurations, a composition of the present teachings can comprise, can consist of, or can consist essentially of about 68% by weight of 22 cSt naphthenic oil, about 5% of ethyl 5-methyl-2-furoate, about 12% by weight of parachlorobenzotrifluoride, about 0.3% by weight of a metal protection additive comprising a triazole metal protectant, about 12% by weight of at least one carrier oil comprising sulfonates, and about 2% by weight of a lubrication additive comprising alkyl phosphate amine esters.

In some configurations, a composition of the present teachings can comprise, can consist of, or can consist essentially of about 49% by weight of 16-17 cSt polyalphaolefin oil, about 16.8% by weight of 22 cSt naphthenic oil, about 12.8% by weight of ethyl 5-methyl-2-furoate, about 1.9% by weight of a metal protection additive comprising a mixture of amino acid and imidazoline derivatives, about 0.1% by weight of a metal protection additive comprising a triazole metal protectant, about 12.4% by weight of a carrier oil comprising calcium dinonylnaphthalene sulfonate, about 1% by weight of a lubrication additive comprising alkyl phosphate amine esters, and about 6% by weight of a lubrication additive comprising inactive sulfurized olefin.

In some configurations, a composition of the present teachings can comprise, can consist of, or can consist essentially of about 49% by weight of 16-17 cSt polyalphaolefin oil, about 16.8% by weight of 22 cSt naphthenic oil, about 12.8% by weight of ethyl 5-methyl-2-furoate, about 1.9% by weight of a metal protection additive comprising a mixture of amino acid and imidazoline derivatives, about 0.1% by weight of a metal protection additive comprising a triazole metal protectant, about 12.4% by weight of at least one carrier oil comprising calcium dinonylnaphthalene sulfonate, about 1% by weight of a lubrication additive comprising alkyl phosphate amine esters, and about 6% by weight of a lubrication additive comprising inactive sulfurized olefin.

In some configurations, a composition of the present teachings can comprise, can consist of, or can consist essentially of about 49.9% by weight of 16-17 cSt polyalphaolefin oil and about 16.1% by weight of 22 cSt naphthenic oil, about 12.3% by weight of ethyl 5-methyl-2-furoate, about 1.8% by weight of a metal protection additive comprising a mixture of amino acid and imidazoline derivatives, 0.1% by weight of a metal protection additive comprising a triazole metal protectant, about 11.9% by weight of a carrier oil comprising calcium dinonylnaphthalene sulfonate, about 2.0% by weight of a lubrication additive comprising alkyl phosphate amine esters, and about 5.8% by weight of a lubrication additive comprising sulfurized fatty acid ester.

In some configurations, a composition of the present teachings can comprise, can consist of, or can consist essentially of about 49.9% by weight of 16-17 cSt polyalphaolefin oil and about 16.1% by weight of 22 cSt naphthenic oil, about 12.3% by weight of ethyl 5-methyl-2-furoate, about 1.8% by weight of a metal protection additive comprising a mixture of amino acid and imidazoline derivatives, 0.1% by weight of a metal protection additive comprising a triazole metal protectant, about 11.9% by weight of at least one carrier oil comprising calcium dinonylnaphthalene sulfonate, about 2.0% by weight of a lubrication additive comprising alkyl phosphate amine esters, and about 5.8% by weight of a lubrication additive comprising sulfurized fatty acid ester.

In some configurations, a composition of the present teachings can comprise, can consist of, or can consist essentially of about 42.8% by weight of 22 cSt naphthenic oil, about 8.0% by weight of 280 cSt naphthenic oil, about 33.0% by weight of ethyl 5-methyl-2-furoate, about 0.2% by weight of a metal protection additive comprising a triazole metal protectant, about 12.0% by weight of a carrier oil comprising sulfonates, about 1.0% by weight of a lubrication additive comprising alkyl phosphate amine esters, and about 3.0% by weight of a lubrication additive comprising inactive sulfurized olefin.

In some configurations, a composition of the present teachings can comprise, can consist of, or can consist essentially of about 42.8% by weight of 22 cSt naphthenic oil, about 8.0% by weight of 280 cSt naphthenic oil, about 33.0% by weight of ethyl 5-methyl-2-furoate, about 0.2% by weight of a metal protection additive comprising a triazole metal protectant, about 12.0% by weight of at least one carrier oil comprising sulfonates, about 1.0% by weight of a lubrication additive comprising alkyl phosphate amine esters, and about 3.0% by weight of a lubrication additive comprising inactive sulfurized olefin.

In some configurations, a composition of the present teachings can comprise, can consist of, or can consist essentially of about 42.8% by weight of 22 cSt naphthenic oil, about 8.0% by weight of 280 cSt naphthenic oil, about 33.0% by weight of ethyl 5-methyl-2-furoate, about 0.2% by weight of a metal protection additive comprising triazole metal protectant, about 12.0% by weight of a carrier oil comprising sulfonates, about 1.0% by weight of a lubrication additive comprising alkyl phosphate amine esters, and about 3.0% by weight of a lubrication additive comprising sulfurized fatty acid ester.

In some configurations, a composition of the present teachings can comprise, can consist of, or can consist essentially of about 42.8% by weight of 22 cSt naphthenic oil, about 8.0% by weight of 280 cSt naphthenic oil, about 33.0% by weight of ethyl 5-methyl-2-furoate, about 0.2% by weight of a metal protection additive comprising triazole metal protectant, about 12.0% by weight of at least one carrier oil comprising sulfonates, about 1.0% by weight of a lubrication additive comprising alkyl phosphate amine esters, and about 3.0% by weight of a lubrication additive comprising sulfurized fatty acid ester.

In some embodiments, the present teachings include methods of cleaning metal. These methods include applying to a metal a formulation disclosed herein.

The instant disclosure sets forth, without limitation, the following aspects.

A metal cleaner of the present teachings can comprise i) 20% to 70% by weight of at least one base oil; and ii) 3% to 60% of at least one furoate ester. In some configurations the 20% to 70% by weight of at least one base oil can be 20% to 50% by weight of at least one base oil.

In various configurations, the at least one base oil can be selected from the group consisting of a naphthenic oil, a synthetic oil, and a combination thereof. In some configurations, the at least one base oil can be selected from the group consisting of 22 cSt naphthenic oil, 280 cSt naphthenic oil, 16-17 cSt polyalphaolefin oil, and a combination thereof. In some configurations, the at least one base oil can be 22 cSt naphthenic oil. In various configurations, the at least one base oil can be 16-17 cSt polyalphaolefin oil. In various configurations, the at least one base oil can be a combination of 22 cSt naphthenic oil and 280 cSt naphthenic oil. In various configurations, the at least one base oil can be a combination of 16-17 cSt polyalphaolefin oil and 22 cSt naphthenic oil.

In various configurations, the at least one furoate ester can be selected from the group consisting of ethyl 5-methyl-2-furoate, methyl 5-methyl-2-furoate, and a combination thereof. In some configurations, the at least one furoate ester can be ethyl 5-methyl-2-furoate.

In various configurations, the metal cleaner can further comprise iii) 0.1% to 15% by weight of at least one metal protection additive; and iv) 0.5% to 20% by weight of at least one lubrication additive. In some configurations. iii) the 0.1% to 20% by weight of at least one metal protection additive can be 0.1% to 5% by weight of at least one metal protection additive; and iv) the 0.5% to 15% by weight of at least one lubrication additive can be 1% to 15% by weight of at least one lubrication additive. In various configurations, the at least one lubrication additive can be selected from the group consisting of alkyl phosphate amine esters, inactive sulfurized olefin, sulfurized fatty acid ester, and a combination thereof. In various configurations, the at least one lubrication additive can comprise alkyl phosphate amine esters. In various configurations, the at least one lubrication additive can comprise an inactive sulfurized olefin. In various configurations, the at least one lubrication additive can comprise a sulfurized fatty acid ester. In various configurations, the at least one metal protection additive can be selected from the group consisting of a triazole metal protectant, a mixture of amino acid and imidazoline derivatives, parachlorobenzotrifluoride, a carrier oil comprising sulfonates and a combination thereof. In various configurations, the at least one metal protection additive can be selected from the group consisting of a triazole metal protectant, a mixture of amino acid and imidazoline derivatives, parachlorobenzotrifluoride, at least one carrier oil comprising sulfonates and a combination thereof. In various configurations, the at least one metal protection additive can comprise a triazole metal protectant. In various configurations, the at least one metal protection additive can comprise a mixture of amino acid and imidazoline derivatives. In various configurations, the at least one metal protection additive can comprise parachlorobenzotrifluoride. In various configurations, the at least one metal protection additive can comprise at least one carrier oil comprising 2% to 6% by weight of at least one sulfonate. In various configurations, the at least one metal protection additive can comprise at least one carrier oil comprising 1% to 6% by weight of at least one sulfonate. In various configurations, the at least one sulfonate can be calcium dinonylnaphthalene sulfonate.

In some configurations, in a metal cleaner of the present teachings, i) the 20% to 70% by weight of at least one base oil is 35% to 50% of at least one base oil; and ii) the 3% to 60% of at least one furoate ester is 10% to 40% of at least one furoate ester. In some configurations the metal cleaner can further comprise, iii) 0.2% to 5% of at least one metal protection additive; and 1% to 10% of at least one lubrication additive.

In various configurations, i) the 20% to 70% by weight of at least one base oil can be about 43.8% by weight of 22 cSt naphthenic oil and about 10% by weight of 280 cSt naphthenic oil; ii) the 3% to 60% of at least one furoate ester can be about 33% by weight of ethyl 5-methyl-2-furoate; iii) the 0.1% to 15% of at least one metal protection additive can be about 0.2% by weight of a metal protection additive comprising a triazole metal protectant and about 12% by weight of at least one carrier oil comprising sulfonates; and iv) the 0.1% to 15% by weight of at least one lubrication additive can be about 1% by weight of a lubrication additive comprising alkyl phosphate amine esters.

In various configurations, i) the 20% to 70% by weight of at least one base oil can be about 68% by weight of 22 cSt naphthenic oil; ii) the 3% to 60% of at least one furoate ester can be about 5% of ethyl 5-methyl-2-furoate; iii) the 0.1% to 15% by weight of at least one metal protection additive can be about 12% by weight of parachlorobenzotrifluoride, about 0.3% by weight of a metal protection additive comprising a triazole metal protectant, and about 12% by weight of at least one carrier oil comprising sulfonates; and iv) the 0.5% to 15% by weight of at least one lubrication additive can be about 2% by weight of a lubrication additive comprising alkyl phosphate amine esters.

In various configurations, i) the 20% to 70% by weight of at least one base oil can be about 49% by weight of 16-17 cSt polyalphaolefin oil and about 16.8% by weight of 22 cSt naphthenic oil; ii) the 3% to 60% of at least one furoate ester can be about 12.8% by weight of ethyl 5-methyl-2-furoate; iii) the 0.1% to 15% by weight of at least one metal protection additive can be about 1.9% by weight of a metal protection additive comprising a mixture of amino acid and imidazoline derivatives, about 0.1% by weight of a metal protection additive comprising a triazole metal protectant, and about 12.4% by weight of at least one carrier oil comprising calcium dinonylnaphthalene sulfonate; and iv) the 0.5% to 15% by weight of at least one lubrication additive can be about 1% by weight of a lubrication additive comprising alkyl phosphate amine esters and about 6% by weight of a lubrication additive comprising inactive sulfurized olefin.

In various configurations, i) the 20% to 70% by weight of at least one base oil can be about 49.9% by weight of 16-17 cSt polyalphaolefin oil and about 16.1% by weight of 22 cSt naphthenic oil; ii) the 3% to 60% by weight of at least one furoate ester can be about 12.3% by weight of ethyl 5-methyl-2-furoate; iii) the 0.1% to 15% by weight of at least one metal protection additive can be about 1.8% by weight of a metal protection additive comprising a mixture of amino acid and imidazoline derivatives, 0.1% by weight of a metal protection additive comprising a triazole metal protectant and about 11.9% by weight of at least one carrier oil comprising calcium dinonylnaphthalene sulfonate; and iv) the 0.5% to 15% by weight of at least one lubrication additive can be about 2.0% by weight of a lubrication additive comprising alkyl phosphate amine esters and about 5.8% by weight of a lubrication additive comprising sulfurized fatty acid ester.

In various configurations, i) the 20% to 70% by weight of at least one base oil can be about 42.8% by weight of 22 cSt naphthenic oil and about 8.0% by weight of 280 cSt naphthenic oil ii) the 3% to 60% of at least one furoate ester can be about 33.0% by weight of ethyl 5-methyl-2-furoate; iii) the 0.1% to 15% by weight of at least one metal protection additive can be about 0.2% by weight of a metal protection additive comprising a triazole metal protectant and about 12.0% by weight of at least one carrier oil comprising sulfonates; and iv) the 0.5% to 15% by weight of at least one lubrication additive can be about 1.0% by weight of a lubrication additive comprising alkyl phosphate amine esters and about 3.0% by weight of a lubrication additive comprising inactive sulfurized olefin.

In various configurations, i) the 20% to 70% by weight of at least one base oil can be about 42.8% by weight of 22 cSt naphthenic oil and about 8.0% by weight of 280 cSt naphthenic oil; ii) the 3% to 60% of at least one furoate ester can be about 33.0% by weight of ethyl 5-methyl-2-furoate; iii) the 0.1% to 15% by weight of at least one metal protection additive can be about 0.2% by weight of a metal protection additive comprising triazole metal protectant and about 12.0% by weight of at least one carrier oil comprising sulfonates; and iv) the 0.5% to 15% by weight of at least one lubrication additive can be about 1.0% by weight of a lubrication additive comprising alkyl phosphate amine esters and about 3.0% by weight of a lubrication additive comprising sulfurized fatty acid ester.

In some configurations a method of cleaning metal in accordance with the present teachings can comprise applying to a metal any formulation in accordance with the present teachings. In various configurations, the metal can comprise a metal surface.

In various configurations, a method of the present teachings can comprise applying a formulation of the present teachings to a metal surface. A metal surface that can be cleaned can be, for example and without limitation, the surface of a metal which is fabricated or forged, such as, without limitation, sheeting, plating, billets, and objects manufactured from metal, such as, without limitation a firearm or an automobile.

BRIEF DESCRIPTION OF THE DRAWINGS

FIG. 1 illustrates the IR spectrum of K-CORR® 1227.

DETAILED DESCRIPTION

The inventors have developed a variety of metal cleaning, lubrication and corrosion prevention formulations using ethyl 5-methyl-2-furoate (ET408™; xF Technologies, Inc., Albuquerque, NM) and methyl 5-methyl-2-furoate (ME 408™; xF Technologies, Inc., Albuquerque, NM). These formulations can comprise: one or more base oils such as, but without limitation, either naphthenic oils or synthetic oils such as the polyalphaolefins (PAOs), and one or more furoate esters. These formulations can further comprise one or more metal protection additives and one or more lubrication additives.

The inventors have found that certain combinations of furoate esters with the other materials can result in phase separations into two or more liquid layers, or precipitation of solids or sludge which can render such combinations unusable for metal cleaning, lubrication or corrosion prevention. In view of such problems, the inventors have developed formulations comprising furoate esters. In these formulations, furoate esters are mixed with base oils and other additives. In various configurations, formulations of the present teachings can comprise furoate esters mixed with base oils and other additives in proportions which the inventors have determined do not cause reactions or phase separations. The formulations can exhibit useful cleaning and solvation properties.

In some configurations, formulations with useful cleaning properties include ones comprising a furoate such as ET 408™ (xF Technologies, Inc., Albuquerque, NM). These formulations can be used, for example, for removal of a mixture of oily and carbonaceous residues (such as firearm residue) from metal or metal surfaces. Some examples of metal surfaces that can be cleaned include sheeting, plating, billets, and the surfaces of objects made out of metal. Examples of metal surfaces that can be cleaned include firearms, automobiles, counters, appliances, desks, household fixtures such as plumbing and metal light fixtures, household tools, and industrial fixtures such as manufacturing equipment and power tools.

Formulation Components

Base oils. Base oils can include any of a number of oils that can be used as a base stock for an oil-based formulation. A base oil, for example, can have a viscosity amenable to being blended to achieve a desired viscosity of a formulation of the present teachings. The normal viscosity units used are centipoise (cP) and centistoke (cSt) and they are usually specified either at 40° C. or 100° F. Unless otherwise noted, a formulation of the present teachings can be specified by type of oil, and the viscosity of the oil can be measured by ASTM D445 at 40° C. and can be reported in centiStokes (cSt).

Examples of base oils suitable for formulations of the present teachings include naphthenic oils and synthetic oils, such as polyalphaolefins (PAOs). Naphthenic oils suitable for use in formulations of the present teachings include 22 cSt naphthenic oil and 280 cSt naphthenic oil. Synthetic oils for use in formulations of the present teachings include 16-17 cSt polyalphaolefin oil. Persons of ordinary skill in the art will appreciate that many other oils may be used while achieving a like result.

Metal protectant additives. A metal protectant additive as used herein is a corrosion inhibitor which can deactivate a metal with which it comes into contact. Metal protectants suitable for use in formulations of the present teachings include, for example and without limitation, triazoles, a mixture of amino acid and imidazoline derivatives (i.e., structural analogues of imidazoline), parachlorobenzotrifluoride, and sulfonates, such as but without limitation, calcium dinonylnaphthalene sulfonate. Examples of triazole metal protectants include ashless liquid yellow metal deactivators, such as that sold under the trade name K-CORR® NF-200 (King Industries, Inc., Norwalk, CT).

Suitable mixtures of organic acids and imidazoline derivatives for formulations of the present teachings include mixtures such as an organic amino acid and an imidazoline derivative, such as, for example, an oil soluble, liquid corrosion preventive additive with an infrared spectrum as depicted in FIG. 1; such a corrosion preventative additive is sold under trade name K-CORR® 1227 (King Industries, Norwalk, CT). K-CORR® 1227 contains 50-<60% of a carboxylate derivative with CAS number 110-25-8 and 50-<60% of an imidazole derivative. This imidazole derivative is soluble in water.

Imidazole is an organic compound having the formula $(CH)_2N(NH)CH$, i.e.,

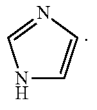

Imidazole is a heterocycle containing a 1,3-$C_3N_2$ ring. Derivatives of imidazole (i.e., structural analogues of imidazole), commonly referred to as imidazoles, contain the 1,3-$C_3N_2$ ring but feature varied substituents. Examples of imidazoles include, for example but without limitation, imidazole trifluoromethanesulfonate salt, imidazole-2-carboxylic acid, imidazole-2-boronic acid, 1-m-tolyl)imidazole, 1-(3-aminopropyl)imidazole, 1H-imidazole-4-carbothioamide, benzimidazole (BZIM), aminobenzimidazole, and methylimidazole. Members of the imidazole family include imidazole compounds and imidazolium salts such as imidazolium chloride, imidazolide, imidazolate salts such as sodium imidazolide, which can be formed from imidazole or imidazoles. Furthermore, in some configurations, an imidazole can be functionalized with the addition of functional groups such as amine, nitro, phenol, extending from nitrogen-containing functional groups, mixtures of organic acids and imidazoline derivatives include mixtures such as an organic amino acid and an imidazoline derivative, such as, for example, an oil soluble, liquid corrosion preventive additive with an infrared spectrum substantially as depicted in FIG. 1; such a corrosion preventative additive is sold under trade name K-CORR® 1227 (King Industries, Inc., Norwalk, CT). K-CORR® 1227 contains 50-<60% of a carboxylate derivative with CAS number 110-25-8 and 50-<60% of an imidazole derivative. This imidazole derivative is soluble in water.

Parachlorobenzotrifluoride (CAS 98-56-6, also 4-chlorobenzotrifluoride or PCBTF) can be obtained from various chemical manufacturers such as The Chemical Company, at about 99% purity. Carrier oils comprising sulfonates include those sold under the trade name NA-SUL® CA/W 146 (King Industries, Inc., Norwalk, CT). Further carrier oils comprising calcium dinonylnaphthalene sulfonate are available in several formulations, including those sold under trade names NA-SUL® CA-HT3 (King Industries, Inc., Norwalk, CT) and NA-SUL® CA-1082 (King Industries, Inc., Norwalk, CT). The formulations and examples of the present teachings indicate the % weight of the commercial formulations used, not the % weight of the active ingredients therein.

Lubrication additives. Lubrication additives that can be used in formulations of the present teachings include, for example and without limitation, wear inhibitors, lubricity agents, extreme pressure agents, and friction modifiers. Non-limiting examples of such additives include metal dialkyldithiophosphates, metal diaryldithiophosphates, alkyl phosphates, tricresyl phosphate, 2-alkyl-4-mercapto-1,3,4-thiadiazole, metal dialkyldithiocarbamates, and metal dialkylphosphorodithioates, wherein the metal can be, for example and without limitation, zinc, molybdenum, or tungsten. Other examples of lubrication additives include phosphorized fats, phosphorized olefins; sulfurized fats, sulfurized olefins and sulfurized paraffins, fatty acids; sulfurized carboxylic acids and their salts, esters of fatty acids, organic molybdenum compounds, molybdenum disulfide, graphite, and borate dispersions. In various configurations of formulations of present teachings, a lubrication additive can be or can comprise, consist of, or consist essentially of a carboxylic acid and its salts, an olefin, and/or a fatty acid ester. In some configurations, a lubrication additive can be an alkyl phosphate amine ester, an inactive sulfurized olefin, or a sulfurized fatty acid ester. In some configurations, an alkyl phosphate amine ester lubricant can be present in an additive such as an ashless rust and corrosion inhibitor or an antiwear additive, such as, for example but without limitation, that sold under the trade name NA-LUBE® AW-6110 (King Industries, Inc., Norwalk, CT). A sulfurized fatty acid ester can be present in inactive sulfur carriers such as that sold under the trade name NA-LUBE® EP-5210 (King Industries, Inc., Norwalk, CT). Its typical properties, according to the manufacturer, include Sulfur Content 10.0%; Active Sulfur Content (ASTM D 1662): <1.0%; Color (ASTM D 1500 neat): 3.5; Viscosity @ 40° C. (ASTM D 445, DIN 51550): 25 mm2/s (cSt); Density @20.0° C. (ASTM D 941): 0.95 g/ml; Weight Per Gallon @ 25° C.: 7.91 lbs.: Flash Point, COC (ASTM D 92, DIN 51376): 170° C. (338° F.). An inactive sulfurized olefin can be present in extreme pressure lubricant additives such as, for example, that sold under the trade name EP-5120 (King Industries, Inc., Norwalk, CT). The formulations and examples of the present teachings indicate the % weight of the commercial formulations used, not the % weight of the active ingredients therein.

Furoate esters. Furoate esters that can be used in a composition of the present teachings include, for example and without limitation, ethyl 5-methyl-2-furoate (ET 408™, xF Technologies, Albuquerque, NM) and methyl 5-methyl-2-furoate (ME 408™, xF Technologies, Albuquerque, NM). ET 408™ (xF Technologies, Albuquerque, NM) furoate ester used in the examples described herein is a commercial grade product that includes minor amounts of methyl furoate and ethyl levulinate. The inventors have determined that these minor impurities do not negatively affect the function of the primary furoate ester.

The furoate ester designated ET 408™ (xF Technologies, Albuquerque, NM) is defined as approximately 95% ethyl furoate, 2.5% methyl furoate and 2.5% ethyl levulinate. The component amounts of furoates in formulations of the present teachings are based on the commercial formulations, not based on the use of pure ethyl furoate or pure methyl furoate. However, the inventors have determined that purities of up to 99% of either ET408™ (xF Technologies. Albuquerque, NM) or ME 408™ (xF Technologies, Albuquerque, NM) will not significantly change the results. The commercial product ME408™ can have minor amounts of ethyl furoate and ethyl levulinate, and is supplied commercially by xF Technologies, Albuquerque, NM at 97% purity.

EXAMPLES

The present teachings including descriptions provided in the Examples that are not intended to limit the scope of any claim or aspect. Unless specifically presented in the past tense, an example can be a prophetic or an actual example. The following non-limiting examples are provided to further illustrate the present teachings. Those of skill in the art, in light of the present disclosure, will appreciate that many changes can be made in the specific embodiments that are disclosed and still obtain a like or similar result without departing from the spirit and scope of the present teachings. As used in the present description and any appended claims, the singular forms “a”, “an” and “the” are intended to include the plural forms as well, unless the context indicates otherwise.

The chemical compounds listed in the examples can be provided by commercial suppliers. In the examples herein, furoate esters ME408™ and ET408™ are supplied by xF Technologies, Albuquerque, NM.

Various standard tests can be used to measure the properties of a formulation of the present teachings, such as standards set by ASTM (ASTM International, West Conshohocken, PA). Viscosities can be measured by ASTM D445. Corrosion, and therefore the ability to protect metals from rust, can be measured by ASTM B117, Operating Salt Spray (Fog) Apparatus and ASTM D1748 Rust Protection by Metal Preservatives in the Humidity Cabinet Lubrication can be measured by ASTM D4172, Wear Preventative Characteristics of Lubricating Fluids (Four-Ball Method).

In some examples, a test for cleaning ability is the Firing Residue test used for firearms cleaning, MIL-PRF-63460(F). Briefly, this test involves burning 5 grams of gunpowder, removing loose residue and then measuring the weight loss of the burnt-on residue removed by the cleaning fluid under controlled conditions. In these conditions only limited mechanical action is used thereby requiring the formulation to dissolve the residue to loosen it from the substrate. A score of 40% is considered acceptable in certain products such as CLP products intended for all three functions of cleaning, lubricating and protection in firearms.

The formulations were also tested to make sure they do not cause corrosion on metals including steel, aluminum, copper, magnesium, brass, and zinc.

Example 1

This example illustrates Formulation 1 of the present teachings.

TABLE 1

| Formulation 1 | |
|---|---|
| Component | Amount (% Weight) |
| 22 cSt naphthenic oil (Pale Oil 300, W.S. Dodge Oil Co., Inc.) | 43.8% |
| 280 cSt naphthenic oil (Calsol 5160S, Calumet Specialty Products Partners, L.P.) | 10.0% |
| Carrier oil with sulfonates (NA-SUL ® CA/W1146, King Industries, Inc.) | 12.0% |
| Ethyl 5-methyl-2-furoate (ET 408 ™, xF Technologies, Inc.) | 33.0% |
| Alkyl phosphate amine esters (NA-LUBE ® ApaleW-6110, King Industries, Inc.) | 1.0% |
| Triazole metal protectant (K-CORR ® NF-200, King Industries, Inc.) | 0.2% |

The viscosity of the above formulation (Formulation 1) under ASTM D445 40° C. was 14.5 cSt. Lubrication was tested under ASTM D4172 4-ball scar and yielded a lubrication value of <0.1 mm (0.8 mm is the value for a standard machine oil). Under ASTM B117 Salt Spray Fog Corrosion, the time was >120 hours. Under ML-PRF-63460(F) Firing Residue Removal, the formulation had 73.8% removal (40% is acceptable.) For the ASTM D1748 Humidity Chamber Test, the time was >900 hours.

Example 2

This example illustrates Formulation 2 of the present teachings.

TABLE 2

| Formulation 2 | |
|---|---|
| Component | Amount (% Weight) |
| 22 cSt naphthenic oil (Pale Oil 300, W.S. Dodge Oil Co., Inc.) | 68.0% |
| Carrier oil with sulfonates (NA-SUL ®CA/W1146, King Industries, Inc.) | 12.0% |
| Parachlorobenzotrifluoride (The Chemical Company) | 12.0% |
| Ethyl 5-methyl-2-furoate (ET 408 ™, xF Technologies, Inc.) | 5.0% |
| Alkyl phosphate amine esters, (NA-LUBE ® AW-6110, King Industries, Inc.) | 2.0% |
| Triazole metal protectant (K-CORR ® NF-200, King Industries, Inc.) | 0.3% |

The viscosity of this formulation (Formulation 2) was tested under ASTM D445 40° C. and yielded a viscosity of 17.3 cSt. The formulation had an ASTM D4172 4-ball scar lubrication value of <0.2 mm (0.8 mm is the value for a standard machine oil). The formulation had an ASTM B117 Salt Spray Fog Corrosion time of >109 hours. The formulation had MIL-PRF-63460(F) Firing Residue Removal of 67.3% (40% is considered acceptable). The formulation had an ASTM D1748 Humidity Chamber Test time >900 hours.

Example 3

This example illustrates Formulation 3 of the present teachings.

TABLE 3

| Formulation 3 | |
|---|---|
| Component | Amount (% Weight) |
| 16-17 cSt polyalphaolefin oil (PAO4, Chevron Phillips Chemical Company L.L.C.) | 49.0% |
| Calcium dinonylnaphthalene sulfonate in carrier oil (NA-SUL ® CA-1082, King Industries, Inc.) | 5.7% |
| Calcium dinonylnaphthalene sulfonate in carrier oil (NA-SUL ® CA-HT3, King Industries, Inc.) | 6.7% |
| Mixture of amino acid and imidazoline derivatives (K-CORR ® 1227, King Industries, Inc.) | 1.9% |
| 22 cSt naphthenic oil (Pale Oil 300, W.S. Dodge Oil Co., Inc.) | 16.8% |
| Ethyl 5-methyl-2-furoate (ET 408 ™, xF Technologies, Inc.) | 12.8% |
| Alkyl phosphate amine esters (NA-LUBE ® AW-6110, King Industries, Inc.) | 1.0% |
| Triazole metal protectant (K-CORR ® NF-200, King Industries, Inc. ) | 0.1% |
| Inactive sulfurized olefin (EP-5120, King Industries, Inc.) | 6.0% |

Various tests were run to determine the properties of the above formulation (Formulation 3). ASTM D445 40° C. yielded a viscosity of 15.5 cSt. The formulation had an ASTM D4172 4-ball scar lubrication value of <0.55 mm (0.8 mm is the value for a standard machine oil). It also had an ASTM B117 Salt Spray Fog Corrosion time of >109 hours. The Military Specification Firing Residue Removal was 72.2% (40% is acceptable).

Example 4

This example illustrates Formulation 4 of the present teachings.

TABLE 4

| Formulation 4 | |
|---|---|
| Component | Amount (% Weight) |
| 16-17 cSt polyalphaolefin oil (PAO4, Chevron Phillips Chemical Company L.L.C.) | 49.9% |
| Calcium dinonylnaphthalene sulfonate in carrier oil (NA-SUL ® CA-1082, King Industries, Inc.) | 5.47% |
| Calcium dinonylnaphthalene sulfonate in carrier oil (NA-SUL ® CA-HT3, King Industries, Inc.) | 6.43% |
| Mixture of amino acid and imidazoline derivatives (K-CORR ® 1227, King Industries, Inc.) | 1.8% |
| 22 cSt naphthenic oil (Pale Oil 300, W.S. Dodge Oil Co., Inc.) | 16.1% |
| Ethyl 5-methyl-2-furoate (ET 408 ™, xF Technologies, Inc.) | 12.3% |

TABLE 4-continued

| Formulation 4 | |
|---|---|
| Component | Amount (% Weight) |
| Alkyl phosphate amine esters (NA-LUBE ® AW-6110, King Industries, Inc.) | 2.0% |
| Triazole metal protectant (K-CORR ® NF-200, King Industries, Inc.) | 0.1% |
| Sulfurized fatty acid ester (NA-LUBE ® EP-5210, King Industries, Inc.) | 5.8% |

Several tests were run to determine the properties of the above formulation (Formulation 4). ASTM D445 40° C. yielded a viscosity of 14.7 cSt. The ASTM D4172 4-ball scar lubrication value was <0.4 mm (0.8 mm is the value for a standard machine oil). The Military Specification Firing Residue Removal was 73.4% (40% is acceptable).

Example 5

This example illustrates Formulation 5 of the present teachings.

TABLE 5

| Formulation 5 | |
|---|---|
| Component | Amount (% Weight) |
| 22 cSt naphthenic oil (Pale Oil 300, W.S. Dodge Oil Co., Inc.) | 42.8% |
| 280 cSt naphthenic oil (Calsol 5160S, Calumet Specialty Products Partners, L.P.) | 8.0% |
| Carrier oil with sulfonates (NA-SUL ®CA/W1146, King Industries, Inc.) | 12.0% |
| Ethyl 5-methyl-2-furoate (ET 408 ™, xF Technologies, Inc.) | 33.0% |
| Alkyl phosphate amine esters (NA-LUBE ® AW-6110, King Industries, Inc.) | 1.0% |
| Triazole metal protectant, (K-CORR ® NF-200, King Industries, Inc.) | 0.2% |
| Inactive sulfurized olefin (EP-5120, King Industries, Inc.) | 3.0% |

The ASTM D445 40° C. viscosity of the above formulation (Formulation 5) was 14.6 cSt.

Example 6

This example illustrates Formulation 6 of the present teachings.

TABLE 6

| Formulation 6 | |
|---|---|
| Component | Amount (% Weight) |
| 22 cSt naphthenic oil (Pale Oil 300, W.S. Dodge Oil Co., Inc.) | 42.8% |
| 280 cSt naphthenic oil (Calsol 5160S, Calumet Specialty Products Partners, L.P.) | 8.0% |
| Carrier oil with sulfonates (NA-SUL ®CA/W1146, King Industries, Inc.) | 12.0% |
| Ethyl 5-rnethyl-2-furoate (ET 408 ™, xF Technologies, Inc.) | 33.0% |
| Alkyl phosphate amine esters (NA-LUBE ® AW-6110, King Industries, Inc.) | 1.0% |
| Triazole metal protectant (K-CORR ® NF-200, King Industries, Inc.) | 0.2% |
| Sulfurized fatty acid ester (NA-LUBE ® EP-5210, King Industries, Inc.) | 3.0% |

The ASTM D445 40° C. viscosity of the above formulation (Formulation 6) was 14.7 cSt.

Example 7

This example illustrates Formulation 7 of the resent teachings.

TABLE 7

| Formulation 7 | |
|---|---|
| Component | Amount (% Weight) |
| 22 cSt naphthenic oil (Pale Oil 300, W.S. Dodge Oil Co., Inc.) | 43.8% |
| 280 cSt naphthenic oil, (Calsol 5160S, Calumet Specialty Products Partners, L.P.) | 10.0% |
| Carrier oil with sulfonates (NA-SUL ®CA/W1146, King Industries, Inc.) | 12.0% |
| Ethyl 5-methyl-2-furoate (ET 408 ™, xF Technologies, Inc.) | 33.0% |
| Alkyl phosphate amine esters (NA-LUBE ® AW-6110, King Industries, Inc.) | 1.0% |
| Triazole metal protectant (K-CORR ® NF-200, King Industries, Inc.) | 0.2% |

Formulation 7 has a40° C. viscosity of 14.5 cSt (14.0 minimum required) It has a 4-ball lubrication value of <0.1 mm (less than 0.8 mm required). It went 120 hours in the Salt Spray test with no spots. It scored 73.8% in the Firing Residue Removal Test (40% minimum required). It passed the Humidity Chamber (900 hours) with no spots. It passed the Produced Corrosion test.

Example 8

This example illustrates comparative tests between Formulations 1-7.

TABLE 8

| Formulation | Viscosity (per ASTM D445) | 4-ball Wear Scar (per ASTM D4172) | Salt Spray (per ASTM B117) | Firing Residue Removal (per MIL-PRF-63460(F)) | Humidity Chamber (per ASTM D1748) |
|---|---|---|---|---|---|
| 1 | 15.5 cSt | <0.1 mm | >120 hours | 73.8% | >900 hours |
| 2 | 17.3 cSt | <0.2 mm | 109 hours | 67.3% | >900 hours |
| 3 | 15.5 cSt | <0.55 mm | >109 hours | 72.2% | ND |
| 4 | 14.7 cSt | <0.4 mm | ND | 73.4% | ND |
| 5 | 14.6 cSt | ND | ND | ND | ND |
| 6 | 14.7 cSt | ND | ND | ND | ND |
| 7 | 14.5 cSt | <0.1 mm | >120 hours | 73.8% | 900 hours |

Viscosity was measured under ASTM D445 40° C., wherein a minimum of 14.0 was required. Lubrication was measured using ASTM D4172 4-ball sear. Using this test, a standard machine oil has a lubrication value of 0.8 mm. Salt Spray Fog Corrosion was measured under ASTM B117. Firing Residue removal was measured under United States Military Specification MIL-PRF-6346(F), which specifies 40% as an acceptable value. Humidity chamber test was performed under ASTM D1748.

All publications cited herein are hereby incorporated by reference, each in its entirety, except that to the extent that if any material incorporated by reference is inconsistent with the express disclosure herein, the language in this disclosure controls.

What is claimed is:

1. A metal cleaner comprising:

i) 3% to 60% by weight of at least one furoate ester;

ii) 20% to 70% by weight of at least one base oil, wherein the at least one base oil is selected from the group consisting of 22 cSt naphthenic oil, 280 cSt naphthenic oil, 16-17 cSt polyalphaolefin oil, and a combination thereof;

iii) 0.1% to 15% by weight of at least one metal protection additive; and iv) 0.5% to 20% by weight of at least one lubrication additive.

2. The metal cleaner of claim 1, comprising from 20% to 50% by weight of the at least one base oil.

3. The metal cleaner of claim 1, comprising from 0.1% to 5% by weight of the at least one metal protection additive, and 1% to 15% by weight of the at least one lubrication additive.

4. The metal cleaner of claim 1, comprising from 35% to 50% by weight of the at least one base oil, and 10% to 40% by weight of the at least one furoate ester.

5. The metal cleaner of claim 1, comprising from 0.2% to 5% by weight of the at least one metal protection additive, and 1% to 10% by weight of the at least one lubrication additive.

6. The metal cleaner of claim 1, wherein the at least one base oil is selected from the group consisting of 22 cSt naphthenic oil, 280 cSt naphthenic oil, and 16-17 cSt polyalphaolefin oil.

7. The metal cleaner of claim 1, wherein the at least one furoate ester is selected from the group consisting of ethyl 5-methyl-2-furoate, methyl 5-methyl-2-furoate and a combination thereof.

8. The metal cleaner of claim 1, wherein the at least one furoate ester is ethyl 5-methyl-2-furoate.

9. The metal cleaner of claim 1, wherein the at least one base oil is 22 cSt naphthenic oil.

10. The metal cleaner of claim 1, wherein the at least one base oil is 16-17 cSt polyalphaolefin oil.

11. The metal cleaner of claim 1, wherein the at least one base oil is a combination of 22 cSt naphthenic oil and 280 cSt naphthenic oil.

12. The metal cleaner of claim 1, wherein the at least one base oil is a combination of 16-17 cSt polyalphaolefin oil and 22 cSt naphthenic oil.

13. The metal cleaner of claim 1, wherein the at least one lubrication additive is selected from the group consisting of alkyl phosphate amine esters, inactive sulfurized olefin, sulfurized fatty acid ester, and a combination thereof.

14. The metal cleaner of claim 1, wherein the at least one lubrication additive comprises alkyl phosphate amine esters.

15. The metal cleaner of claim 1, wherein the at least one lubrication additive comprises an inactive sulfurized olefin.

16. The metal cleaner of claim 1, wherein the at least one lubrication additive comprises a sulfurized fatty acid ester.

17. The metal cleaner of claim 1, wherein the at least one metal protection additive is selected from the group consisting of a triazole metal protectant, a mixture of amino acid and imidazoline derivatives, parachlorobenzotrifluoride, at least one carrier oil comprising sulfonates and a combination thereof.

18. The metal cleaner of claim 1, wherein the at least one metal protection additive comprises a triazole metal protectant.

19. The metal cleaner of claim 1, wherein the at least one metal protection additive comprises a mixture of amino acid and imidazoline derivatives.

20. The metal cleaner of claim 1, wherein the at least one metal protection additive comprises parachlorobenzotrifluoride.

21. The metal cleaner of claim 1, wherein the at least one metal protection additive comprises at least one carrier oil comprising 2% to 6% by weight of at least one sulfonate.

22. The metal cleaner of claim 21, wherein the at least one sulfonate is calcium dinonylnaphthalene sulfonate.

23. The metal cleaner of claim 1, comprising:

i) about 43.8% by weight of 22 cSt naphthenic oil and about 10% by weight of 280 cSt naphthenic oil;

ii) about 33% by weight of ethyl 5-methyl-2-furoate;

iii) about 0.2% by weight of a metal protection additive comprising a triazole metal protectant and about 12% by weight of at least one carrier oil comprising sulfonates; and iv) about 1% by weight of a lubrication additive comprising alkyl phosphate amine esters.

24. The metal cleaner of claim 1, comprising:

i) about 68% by weight of 22 cSt naphthenic oil;

ii) about 5% of ethyl 5-methyl-2-furoate;

iii) about 12% by weight of parachlorobenzotrifluoride, about 0.3% by weight of a metal protection additive comprising a triazole metal protectant, and about 12% by weight of at least one carrier oil comprising sulfonates; and iv) about 2% by weight of a lubrication additive comprising alkyl phosphate amine esters.

25. The metal cleaner of claim 1, comprising:

i) about 49% by weight of 16-17 cSt polyalphaolefin oil and about 16.8% by weight of 22 cSt naphthenic oil;

ii) about 12.8% by weight of ethyl 5-methyl-2-furoate;

iii) about 1.9% by weight of a metal protection additive comprising a mixture of amino acid and imidazoline derivatives, about 0.1% by weight of a metal protection additive comprising a triazole metal protectant, and about 12.4% by weight of at least one carrier oil comprising calcium dinonylnaphthalene sulfonate; and iv) about 1% by weight of a lubrication additive comprising alkyl phosphate amine esters and about 6% by weight of a lubrication additive comprising inactive sulfurized olefin.

26. The metal cleaner of claim 1, comprising:

i) about 49.9% by weight of 16-17 cSt polyalphaolefin oil and about 16.1% by weight of 22 cSt naphthenic oil;

ii) about 12.3% by weight of ethyl 5-methyl-2-furoate;

iii) about 1.8% by weight of a metal protection additive comprising a mixture of amino acid and imidazoline derivatives, about 0.1% by weight of a metal protection additive comprising a triazole metal protectant and about 11.9% by weight of a carrier oil comprising calcium dinonylnaphthalene sulfonate; and iv) about 2.0% by weight of a lubrication additive comprising alkyl phosphate amine esters and about 5.8% by weight of a lubrication additive comprising sulfurized fatty acid ester.

27. The metal cleaner of claim 1, comprising:

i) about 42.8% by weight of 22 cSt naphthenic oil and about 8.0% by weight of 280 cSt naphthenic oil ii) about 33.0% by weight of ethyl 5-methyl-2-furoate;

iii) about 0.2% by weight of a metal protection additive comprising a triazole metal protectant and about 12.0% by weight of at least one carrier oil comprising sulfonates; and iv) about 1.0% by weight of a lubrication additive comprising alkyl phosphate amine esters and about 3.0% by weight of a lubrication additive comprising inactive sulfurized olefin.

28. The metal cleaner of claim 1, comprising:

i) about 42.8% by weight of 22 cSt naphthenic oil and about 8.0% by weight of 280 cSt naphthenic oil;

ii) about 33.0% by weight of ethyl 5-methyl-2-furoate;

iii) about 0.2% by weight of a metal protection additive comprising triazole metal protectant and about 12.0% by weight of at least one carrier oil comprising sulfonates; and iv) about 1.0% by weight of a lubrication additive comprising alkyl phosphate amine esters and about 3.0% by weight of a lubrication additive comprising sulfurized fatty acid ester.

29. A method of cleaning metal, comprising applying to a metal surface the metal cleaner of claim 1.

* * * * *